United States Patent
Hiddink et al.

(10) Patent No.: US 9,807,377 B2
(45) Date of Patent: Oct. 31, 2017

(54) AUTO-STEREOSCOPIC DISPLAY DEVICE

(75) Inventors: Martin Gerard Hendrik Hiddink, S-Hertogenbosch (NL); Siebe Tjerk De Zwart, Eindhoven (NL); Oscar Hendrikus Willemsen, Eindhoven (NL); Michel Cornelis Josephus Marie Vissenberg, Eindhoven (NL); Thomas Caspar Kraan, Eindhoven (NL); Marc Joseph Rita Op De Beeck, Eindhoven (NL); Remco Theodorus Johannes Muijs, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 584 days.

(21) Appl. No.: 12/680,228

(22) PCT Filed: Sep. 30, 2008

(86) PCT No.: PCT/IB2008/053971
§ 371 (c)(1),
(2), (4) Date: Jun. 17, 2010

(87) PCT Pub. No.: WO2009/044334
PCT Pub. Date: Apr. 9, 2009

(65) Prior Publication Data
US 2010/0259819 A1    Oct. 14, 2010

(30) Foreign Application Priority Data
Oct. 2, 2007 (EP) .................................... 07117739

(51) Int. Cl.
G02B 27/22 (2006.01)
H04N 13/04 (2006.01)
G02B 27/26 (2006.01)

(52) U.S. Cl.
CPC ..... *H04N 13/0411* (2013.01); *G02B 27/2242* (2013.01); *G02B 27/2285* (2013.01);
(Continued)

(58) Field of Classification Search
CPC ............ G02B 27/2214; G02B 27/2242; G02B 27/225; G02B 27/281; G02B 27/286; H04N 13/0404
(Continued)

(56) References Cited

U.S. PATENT DOCUMENTS 5,432,569 A    7/1995  Ohtsuka
5,715,029 A *  2/1998  Fergason ...................... 349/196
(Continued)

FOREIGN PATENT DOCUMENTS

CN    101025476 A    8/2007
GB    2196166 A1     4/1988
(Continued)

*Primary Examiner* — Audrey Y Chang (57) ABSTRACT

An auto-stereoscopic display device includes a display panel having an array of display pixels for producing a display; and a view forming unit having an array of view forming elements. Each view forming elements is configurable to focus the outputs of groups of the display pixels into views projected towards a user in different directions. The display device further includes a view deflecting unit to selectably change the directions in which the plurality of views is projected towards the user. The view deflecting unit includes at least one birefringent prism having a first refractive index for light having a first polarization direction and a second refractive index for light having a second polarization direction. The view deflecting unit further includes a polarization switch in registration with the birefringent prism for providing the birefringent prism with display light having the first or second polarization direction.

12 Claims, 8 Drawing Sheets

(52) U.S. Cl.
CPC ......... *G02B 27/26* (2013.01); *H04N 13/0404* (2013.01); *H04N 13/0447* (2013.01)

(58) Field of Classification Search
USPC ............ 359/463, 464, 465; 349/15, 196, 96; 348/57, 59
See application file for complete search history.

(56) References Cited

U.S. PATENT DOCUMENTS

| | | | |
|---|---|---|---|
| 5,900,977 A * | 5/1999 | Hikmet | G02B 5/3083 349/96 |
| 6,057,878 A | 5/2000 | Ogiwara et al. | |
| 6,064,424 A | 5/2000 | Van Berkel et al. | |
| 6,169,594 B1 | 1/2001 | Aye et al. | |
| 6,533,420 B1 | 3/2003 | Eichenlaub | |
| 7,099,080 B2 * | 8/2006 | Lipton et al. | 359/463 |
| 7,245,430 B2 * | 7/2007 | Kobayashi et al. | 359/464 |
| 7,357,510 B2 * | 4/2008 | Kim | G02B 27/2235 348/57 |
| 7,710,648 B2 * | 5/2010 | Chestak et al. | 359/465 |
| 2004/0130503 A1 | 7/2004 | Hamagishi et al. | |
| 2004/0164927 A1 | 8/2004 | Suyama et al. | |
| 2004/0239757 A1 | 12/2004 | Alden | |
| 2004/0263968 A1 | 12/2004 | Kobayashi et al. | |
| 2006/0139751 A1 | 6/2006 | Cha et al. | |
| 2006/0158729 A1 | 7/2006 | Vissenberg et al. | |
| 2006/0170834 A1 | 8/2006 | Kim et al. | |
| 2006/0291050 A1 * | 12/2006 | Shestak et al. | 359/443 |

FOREIGN PATENT DOCUMENTS

| | | |
|---|---|---|
| GB | 2405519 A1 | 3/2005 |
| GB | 2405542 A | 3/2005 |
| JP | H05204001 A | 8/1993 |
| JP | 0751232 | 2/1995 |
| JP | 2004325494 A | 11/2004 |
| JP | 2005223727 | 8/2005 |
| TW | 200408861 A | 6/2004 |
| WO | 2004111913 A2 | 12/2004 |

* cited by examiner

AUTO-STEREOSCOPIC DISPLAY DEVICE

FIELD OF THE INVENTION

This invention relates to an auto-stereoscopic display device comprising image forming means, such as a display panel having an array of display pixels, and view forming means. The view forming means may be an array of lenticular elements arranged over the image forming element through which the display pixels are viewed. The invention also relates to a method of driving an auto-stereoscopic display device.

BACKGROUND OF THE INVENTION

A known auto-stereoscopic display device is described in GB 2196166 A. This known device comprises a two dimensional liquid crystal display panel having a row and column array of display pixels acting as an image forming element to produce the display. An array of elongate lenticular elements extending parallel to one another overlies the display pixel array and acts as a view forming element. The display pixels are observed through these lenticular elements by a user or viewer.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image.

In other arrangements, each lenticule is associated with a group of three or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. For example, a display panel having an array of 600 rows and 800 columns of display pixels may provide a four-view auto-stereoscopic display in which each view comprises an array of 600 rows and 200 columns of display pixels. This substantial difference between vertical and horizontal resolution is undesirable.

Furthermore, it will also be appreciated that there is a trade off between the viewing angle of the display and the perception of three dimensional depth in the display. In particular, to provide a display having a wide viewing angle, it is necessary to distribute the projected views over a large angle, for example 60°. However, such a display provides a shallow three dimensional image with little perception of depth. In contrast, in order to provide a realistic three dimensional image with good depth, it is necessary to concentrate all of the projected views across a small viewing angle.

SUMMARY OF THE INVENTION

It is an object of the invention to provide a display having a good image resolution, a wide viewing angle and a good perception of depth.

The invention is defined by the independent claims. The dependent claims define advantageous embodiments According to an aspect of the invention, there is provided an arrangement for use in an auto-stereoscopic display device. The auto-stereoscopic device may be a multi-view auto-stereoscopic display device.

In use, the view deflecting means changes the directions in which the plurality of views, formed by the view forming means, are projected towards the user or viewer. In particular, refraction of the views at the birefringent prism varies depending on the polarization direction of the display light. View deflecting means comprising polarizations switches have been found to be capable of high switching speeds, since the polarization switch can be formed to be very thin and/or to have a constant thickness.

Each view is typically deflected so that it fills the substantially dark angles between the undeflected views. A typical deflection angle is about half a degree. In this way the need for defocusing of the display to reduce the effect of the dark angles may be reduced or eliminated. In many cases the image forming means is composed of pixels giving of display light and dark regions separating the pixels. The dark regions may be formed by a black mask. The view forming means also image these dark regions between the views at angels called the dark angles. The effect of dark angles is also commonly known as dark banding due to dark bands separating the views observed by the viewer. One way to reduce dark banding is to place the image forming means just out of focus from the view forming means, therewith blurring the image observed by the viewer somewhat and smearing the dark bands.

If the image forming means is sequentially driven with data for first and second pluralities of views in synchronization with the operation of the view deflecting means, then the number of views may effectively be doubled without any resolution loss. If the image forming means is constantly driven with data for the same plurality of views, then the angle of each view may be increased and, as mentioned above, the need for defocusing of the display to reduce the effect of the dark angles may be reduced or eliminated.

The polarization switch may comprise a switchable polarization rotator arranged to selectably change the polarization direction of transmitted light from the first direction to the second direction. In this case, the polarization switch also comprises a means for polarizing the display light so that the polarization rotator is provided with light having the first polarization direction. This polarizing means may, however, form a functional part of the image forming means and/or the view forming means.

The switchable polarization rotator may comprise a liquid crystal material disposed between transparent electrodes. Voltages are then applied across the electrodes to induce deformation of the liquid crystal material, which may be a twisted nematic (TN), or any other kind of liquid crystal material. Application of the voltages across the electrodes alters the extent to which the polarization direction of the display light is rotated by the liquid crystal material.

The at least one birefringent prism may comprise a first surface for receiving light into the prism and a second surface for transmitting light out from the prism, the first and second surfaces of the prism defining an acute angle. The acute angle may, for example be in the range 1° to 3°.

The birefringent prism may be provided with a respective interfacing material layer arranged adjacent to the second surface of the prism. The interfacing material layer is more optically isotropic than the birefringent prism, and the extent to which the views are deflected by the view forming means depends on the difference in refractive index between the birefringent prism and the interfacing layer for light of a given polarization. This enables setting of deflection by choice of material.

The interfacing material layer may define a second prism, the second prism having a first surface provided adjacent to the second surface of the birefringent prism and a second surface arranged parallel to the first surface of the birefringent prism.

Advantageously, the interfacing material layer has the same refractive index for the light having the first and second polarization directions, and the refractive index of the interfacing material layer is substantially either the first or second refractive index. With this arrangement, the view deflecting means is switchable between a state in which it causes no deflection and a state in which it causes deflection.

Arrays of birefringent prisms and second prisms, each having a saw tooth arrangement, may be provided so as to minimize the thickness of the respective layers. The prisms may or may not be aligned with the view forming elements.

The view forming means may be configurable to project the plurality of views in directions that are separated by substantially constant angles. Further, the view deflecting means may be arranged to selectably change the directions in which the plurality of views are projected by substantially constant angles. Still further, the angles between the views projected by the view forming means is preferably double the angles by which the plurality of views are changed by the view deflecting means. This preferred arrangement provides an arrangement for a display device in which the number of views may be doubled and spread at equal angles across the viewing field.

The array of view forming elements comprises an array of lenticular lenses or a barrier layer having an array of transmissive slits. In the case of lenticular lenses, the view forming means may be arranged adjacent a plane surface of the lenticular lenses or adjacent a convex surface of the lenticular lenses.

Multiple ones of the view deflecting means may be stacked in series to provide for tripling or even greater increases in the number of views provided by a display device. Such arrangements, however, require faster switching times than those which comprise a single view deflecting means.

According to another aspect of the invention, there is provided an auto-stereoscopic display device comprising: an image forming means having an array of display pixels for producing a display; and the arrangement described above in registration with the image forming means. The image forming means may comprise a liquid crystal display (LCD) panel, a LED pixel based display panel, CRT panel or any other display panel. A LCD and LED panel may be advantageous since they may be entirely flat. In addition a LED panel may be an energy saving option due to the low power high efficiency of LED's. The display device may be a multi view auto-stereoscopic display device.

According to another aspect, the display device may further comprise a driving means arranged to drive the image forming means with display data for first and second pluralities of views in synchronization with the controlling of the view deflecting means to project the first and second pluralities of views in different directions.

More particularly, the driving means may be arranged to: in a first portion of a driving cycle, drive the image forming means with a frame of display data for a first plurality of views and control the view deflecting means so that the plurality of views are projected towards the user in a first plurality of directions; and in a second portion of the driving cycle, drive the image forming means with a frame of display data for a second plurality of views and control the view deflecting means so that the plurality of views are projected towards the user in a second plurality of directions different to the first plurality of directions.

Alternatively, a driving means of the display device may be arranged to drive the image forming means with display data for a plurality of views and control of the view deflecting means to project the plurality of views in different directions. In that case, the driving means may be arranged to: in a first portion of a driving cycle, drive the image forming means with a frame of display data for a plurality of views and control the view deflecting means so that the plurality of views are projected towards the user in a first plurality of directions; and in a second portion of the driving cycle, drive the image forming means with the same frame of display data for the plurality of views and control the view deflecting means so that the plurality of views are projected towards the user in a second plurality of directions different to the first plurality of directions.

The driving means may have the form of an integrated circuit, possibly comprised within a chip or small computer. The integrated circuit, chip or computer, may be prepared using for example standard electronics and/or semiconductor methods.

The view forming means may be arranged between the image forming means and the view deflecting means in such a way that a separation, $S_{deflection}$, between the view forming means and the view deflecting means is given by the following equation:

$$S_{deflection} = \left( \frac{(m+1/2)P}{(n+1/2)X_{shift,view}} - 1 \right) S_{viewform}$$

where m and n are positive integers, P is a horizontal repetition pitch of the image forming means, $X_{shift,view}$ is the difference between the values of $X_{view}$ for successive views, $X_{view}$ being the horizontal distance between the centre of a pixel which generates a view and the axis of an associated view forming element, and $S_{viewform}$ is the separation between the image forming means and the view forming means. The horizontal repetition pitch is typically three times the pixel pitch for a color image forming means arranged to have repeating triplets of red, green and blue pixels.

In practical display devices, a separation, $S_{deflection}$, between the view forming means and the view deflecting means is inevitable. In most configurations, this separation causes the undeflected and deflected views to be unevenly spaced. However, display devices having parameters which comply with the above equation are capable of providing views which have an evenly spaced angular distribution and evenly spaced pixel structures, even when there is a real and significant separation, $S_{deflection}$, between the view forming means and the view deflecting means.

The separation, $S_{viewform}$, between the image forming means and the view forming means may be arranged to be an integer multiple, for example five times, the separation, $S_{deflection}$, between the view forming means and the view deflecting means. In this case, according to the above equation, and with m and n set to zero, the deflection provided by the view deflecting means can be minimized so as to avoid significant aberration, while at the same time providing a reasonably small device thickness. The equation can, alternatively, be used to provide the minimum practical device thickness by substituting in the minimum $S_{deflection}$ that can be manufactured.

According to another aspect of the invention, there is provided a method for driving a multi-view auto-stereoscopic display device according to the invention.

The invention also provides a computer program product enabling a programmable device to carry out the steps of the driving method according to the invention. The invention may be embodied within computer program code means adapted to perform all the steps of the above described method when said program is run on a computer.

The computer program may be embodied on a computer readable medium.

According to another aspect of the invention, there is provided a driving device for a multi-view auto-stereoscopic display device according to the invention. The driving device may have the form of an IC chip or small computer, manufactured using for example standard semiconductor methods.

According to another aspect of the invention, there is provided a multi-view auto-stereoscopic display device, the device comprising:

an image forming means having an array of display pixels for producing a display;

a view forming means positioned over and in registration with the image forming means and having an array of view forming elements, the view forming elements each being configurable to focus the outputs of groups of the display pixels into a plurality of views projected towards a user in different directions; and a view deflecting means positioned over and in registration with the view forming means, the view deflecting means being arranged to selectably change the directions in which the plurality of views are projected towards the user, wherein the separation between the view forming means and the view deflecting means, $S_{deflection}$, is:

$$S_{deflection} = \left( \frac{(m+1/2)P}{(n+1/2)X_{shift,view}} - 1 \right) S_{lenticular}$$

where m and n are positive integers, P is a horizontal repetition pitch of the image forming means, $X_{shift,view}$ is the difference between the values of $X_{view}$ for successive views, $X_{view}$ being the horizontal distance between the centre of a pixel which generates a view and the axis of an associated view forming element, and $S_{lenticular}$ is the separation between the image forming means and the view forming means. The horizontal repetition pitch is typically three times the pixel pitch for a color image forming means arranged to have repeating triplets of red, green and blue pixels. This embodiment may be used independent of the polarization switch providing the first and second polarization light.

U.S. Pat. No. 6,064,424 discloses an auto-stereoscopic display device similar to that described above, except that the elongate lenticular elements are slanted at an angle to the column direction of the display panel. By slanting the lenticular elements, some of the reduction in horizontal resolution, which would otherwise be required, is transferred to the vertical resolution. It thus becomes possible to "consume" both vertical and horizontal resolution to increase the number of views displayed by the device. Nevertheless, it is still necessary to sacrifice resolution to obtain a display having a wide viewing angle and/or a good perception of depth.

BRIEF DESCRIPTION OF THE DRAWINGS

Embodiments of the invention will now be described, purely by way of example, with reference to the accompanying drawings, in which.

DETAILED DESCRIPTION OF EMBODIMENTS

The invention provides an auto-stereoscopic display device of the type that has an image forming element and a view forming element. The display may be a multi-view auto-stereoscopic display. The device comprises a driving means in the form of an integrated circuit, incorporated within a chip or computer which is arranged to sequentially drive each pixel with information for different views. The different views are projected in different directions by switching a view deflecting means in synchronization with the driving of the display pixels. The different views are thereby sequentially projected by the view deflecting means in different directions.

Figure 1:
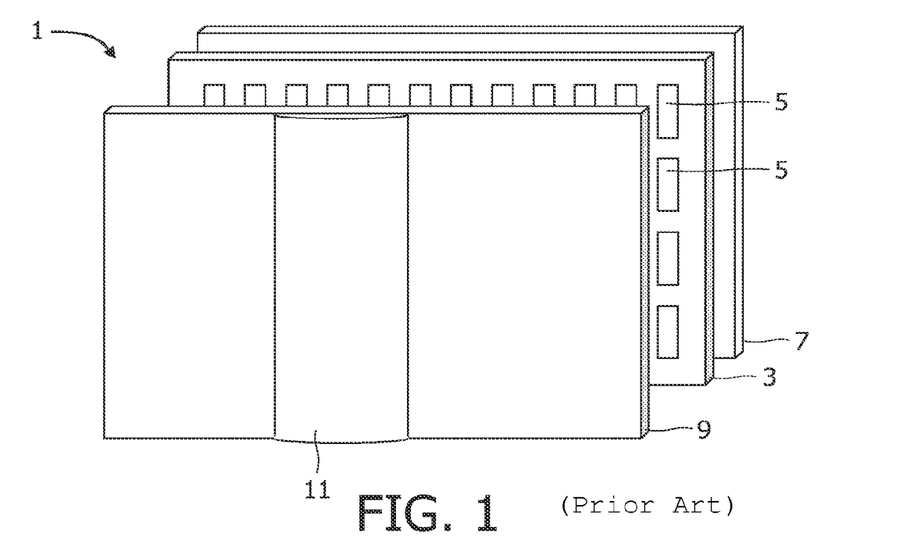
FIG. 1 is a schematic perspective view of a known auto-stereoscopic display device.

FIG. 1 is a schematic perspective view of a known multi-view auto-stereoscopic display device 1. The known device 1 comprises a liquid crystal display panel 3 of the active matrix type that acts as an image forming means to produce the display.

The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The liquid crystal display panel 3 comprises a pair of spaced transparent glass substrates, between which an aligned twisted nematic or other liquid crystal material, is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity. The lenticular elements 11 act as view forming elements to perform a view forming function.

The lenticular elements 11 are in the form of convex cylindrical lenses, and they act as a light output directing means to provide different images, or views, from the display panel 3 to the eyes of a user positioned in front of the display device 1. The cylindrical surfaces of the lenticular elements 11 shown in FIG. 1 face away from the display panel 3. However, in other arrangements, the cylindrical surfaces of the lenticular elements 11 may face towards the display panel 3.

The auto-stereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

Figure 2:
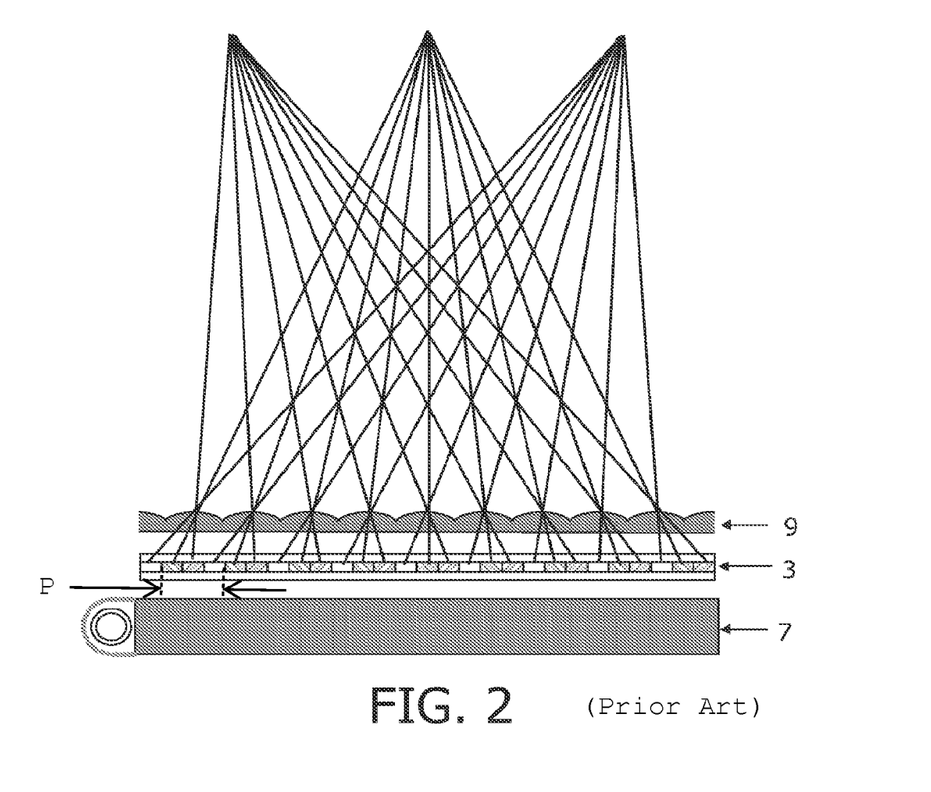
FIG. 2 is a schematic cross sectional view of the display device shown in FIG. 1.

FIG. 2 shows the principle of operation of a lenticular type imaging arrangement as described above and shows the light source 7, display panel 3 and the lenticular sheet 9. The arrangement provides three views each projected in different directions. Each pixel of the display panel 3 is driven with information for one specific view.

Figure 3:
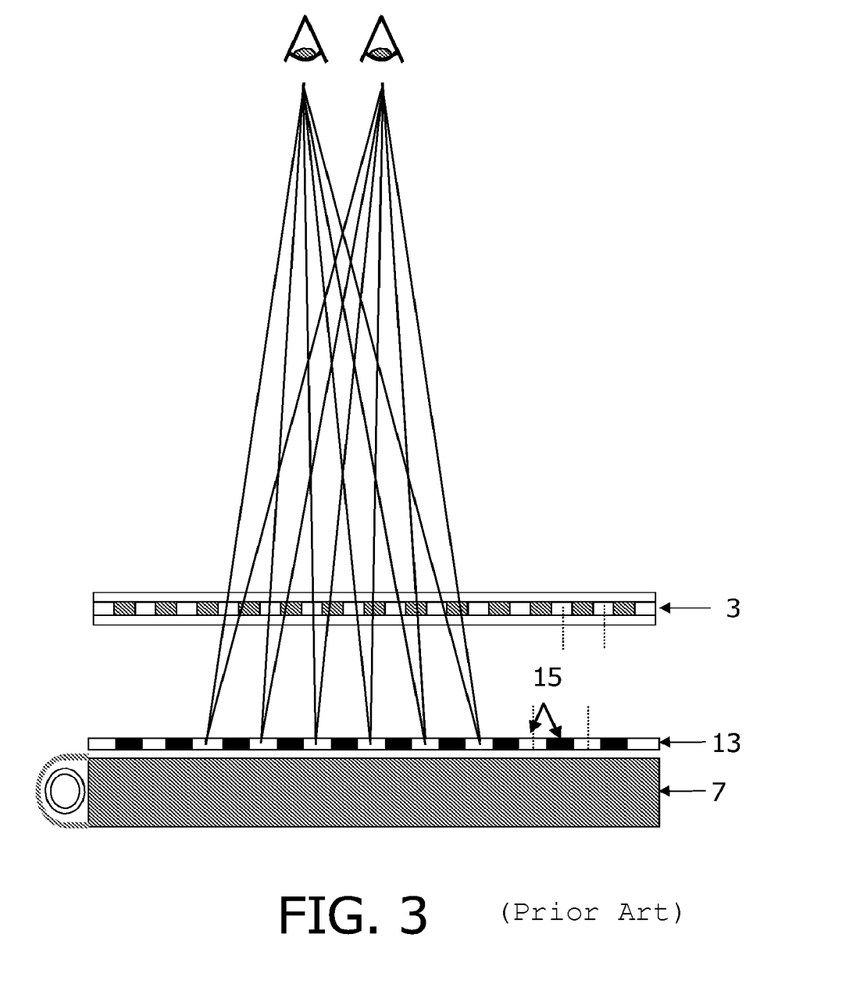
FIG. 3 is a schematic cross sectional view of another known auto-stereoscopic display device.

FIG. 3 shows the principle of operation of a barrier type imaging arrangement. The barrier type arrangement is similar to the lenticular type arrangement and includes a light source 7 and a display panel 3. However, instead of a lenticular sheet, the barrier type arrangement is provided with a barrier device 13 defining a plurality of narrow slits 15. As shown in the Figure, the barrier type arrangement operates in substantially the same way as the lenticular type arrangement in operating as view forming elements to provide a plurality of views. In the example shown, two views are provided.

Figure 4:
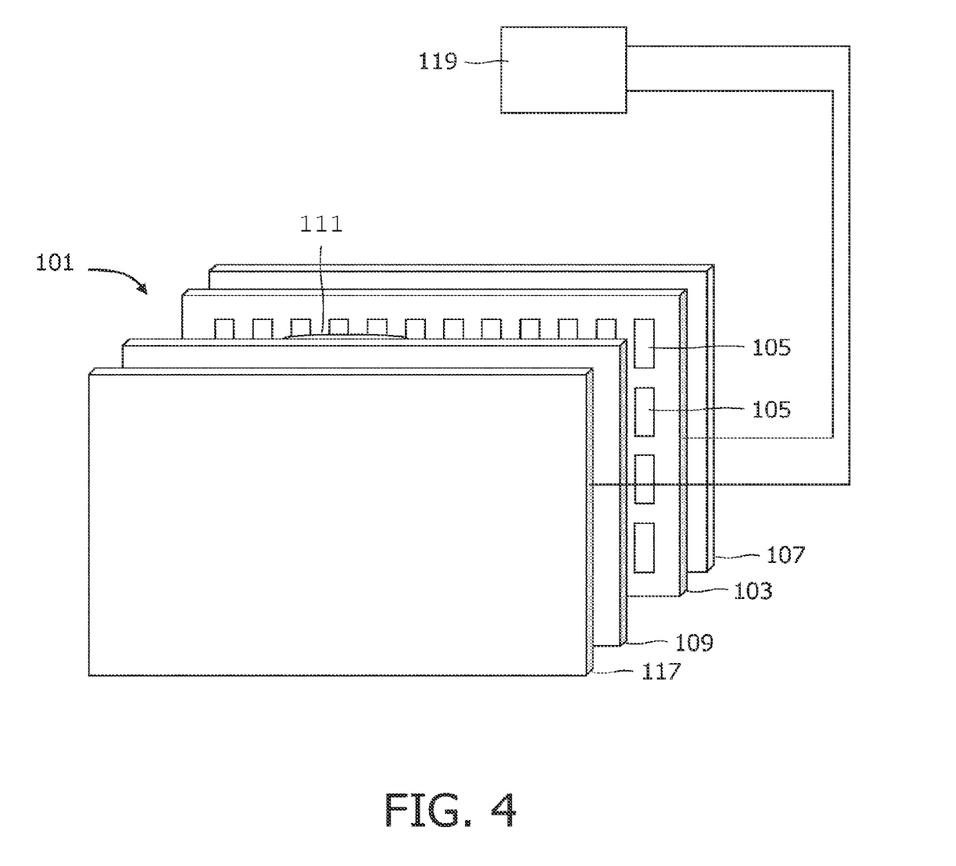
FIG. 4 is a schematic perspective view of an auto-stereoscopic display device according to the invention.

FIG. 4 is a schematic perspective view of a multi-view auto-stereoscopic display device 101 according to the invention. The device 101 is similar to the device 1 shown in FIGS. 1 and 2. In particular, the device 101 comprises a display panel 103 performing an image forming function, a light source 107 for the display panel 103 having pixels 105, and a lenticular sheet 109 performing a view forming function. These elements are identical to those described above with reference to FIG. 1, except that the cylindrical surfaces of the lenticular elements 111 face towards the display panel 3.

Referring to FIG. 4, it can be seen that the device 101 according to the invention additionally comprises a view deflecting layer 117, arranged over and in registration with the lenticular sheet 109. The view deflecting layer 117 is arranged to selectably change the directions in which the plurality of views, formed by the lenticular elements 111, are projected towards the user. The device 101 also includes a display driver 119 for driving the display panel 103 and for switching the view deflecting layer 117.

Figure 5A:
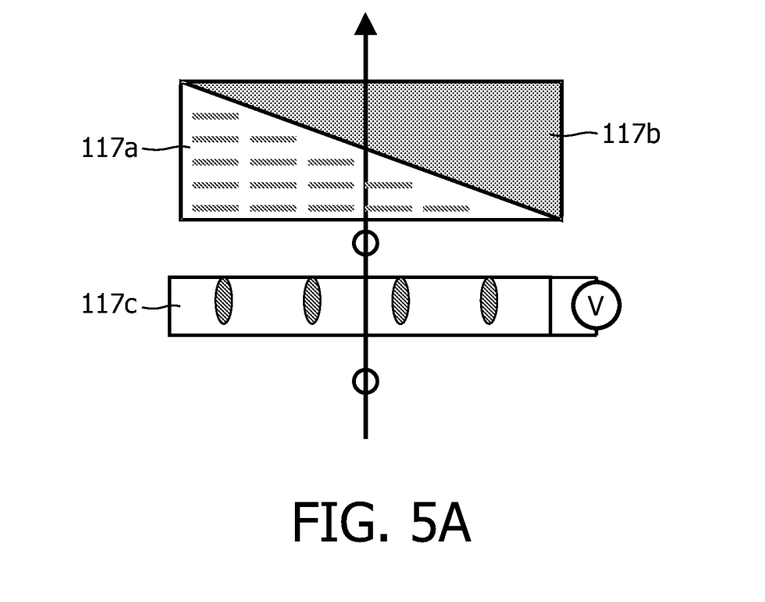
FIGS. 5A and 5B are schematic cross sectional views used to explain the operation of an element of the display device shown in FIG. 4.
Figure 5B:
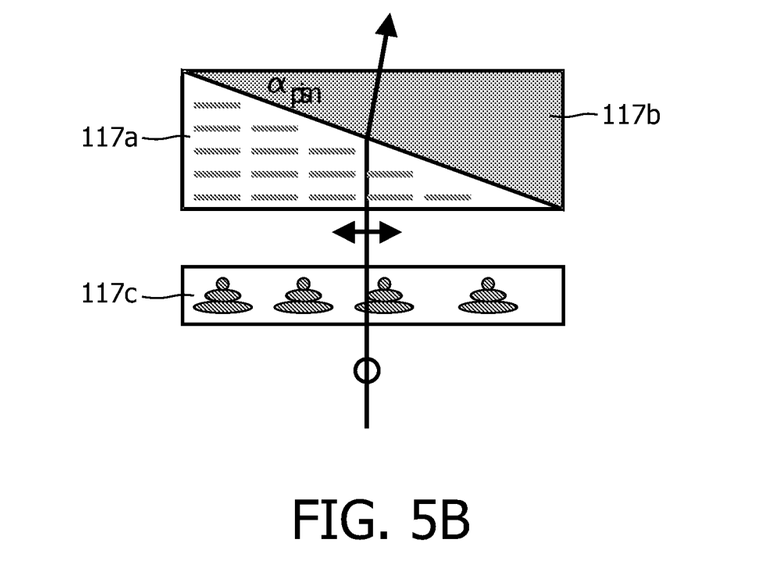

The structure of the view deflecting layer 117 is shown in greater detail in FIGS. 5A and 5B, which also show its operating principle. The view deflecting layer 117 comprises arrays of birefringent prisms 117a and optically isotropic prisms 117b arranged in contact with one another. The respective arrays of prisms 117a, 117b are arranged over the display area and each define "saw tooth" patterns.

The prisms 117a, 117b are arranged so that display light from the lenticular sheet 109 passes into the birefringent prisms 117a through first surfaces thereof and passes out of the birefringent prisms 117a through second surfaces thereof. The first surfaces of the birefringent prisms 117a are arranged to be parallel to the plane of the lenticular sheet 109 and the second surfaces of the birefringent prisms 117a are arranged to define an acute angle of 2° with the first surfaces.

The prisms 117a, 117b are also arranged so that display light from the birefringent prisms 117a passes directly into the isotropic prisms 117b through first surfaces thereof arranged in contact with the second surfaces of the birefringent prisms 117a. The display light passes out of the isotropic prisms 117b through second surfaces thereof and is projected towards the user. The second surfaces of the isotropic prisms 117b are arranged to be parallel to the first surfaces of the birefringent prisms 117a.

The prisms 117a, 117b are arranged so that they selectively refract the display light at their boundary, depending upon the polarization direction of the display light which is incident thereon. Thus, the view deflecting layer 117 further comprises a polarization switch 117c provided between the lenticular sheet 109 and the prisms 117a, 117b for selectably providing the prisms 117a, 117b with display light polarized in a first or second direction.

The polarization switch 117c comprises a layer of twisted nematic liquid crystal material sandwiched between a pair of transparent substrates. Each of the substrates is provided with transparent alignment layers for aligning the liquid crystal material between the substrates and with transparent electrodes for applying voltage waveforms across the electrodes. Suitable alignment and electrode layers will be known to those skilled in the art. The polarization switch 117c also comprises a polarizing layer, which underlies the liquid crystal cell, for providing the liquid crystal cell with polarized light. In the example shown, the polarizing layer is a functional element of the display panel 3, which by coincidence outputs polarized display light.

In use, the view deflecting layer 117 is switched to intermittently deflect the plurality of views formed by the lenticular elements 111. In the state shown in FIG. 5A, a voltage waveform is applied across the electrodes of the polarization switch 117c to untwist the aligned liquid crystal material. In this state, the liquid crystal material of the switch 117c does not alter the polarization direction of the display light from the lenticular sheet 109, which light has a first polarization direction. The refractive index of the birefringent prism 117a for the display light having the first polarization direction is the same as the refractive index of the isotropic prism 117b. As such, there is no refraction at the boundary between the prisms 117a, 117b, and the views are projected towards the user with slight lateral shift, but no angular deflection.

In the state shown in FIG. 5B, the voltage waveform across the electrodes of the polarization switch 117c has been removed, which causes the aligned liquid crystal material to return to its natural twisted configuration. In this state, the liquid crystal material twists the polarization direction of the display light from the first direction to the second direction. The refractive index of the birefringent prism 117a for the display light having the twisted second polarization direction is different to the refractive index of the isotropic prism 117b. As such, there is refraction of the display light at the boundary between the prisms 117a, 117b, and the views are projected towards the user with slight lateral shift and angular deflection.

Figure 6A:
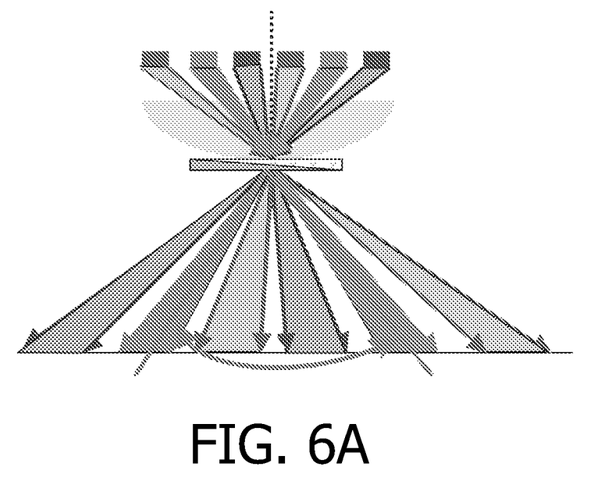
FIGS. 6A and 6B are schematic cross sectional views used to explain the operation of the display device shown in FIG. 4.
Figure 6B:
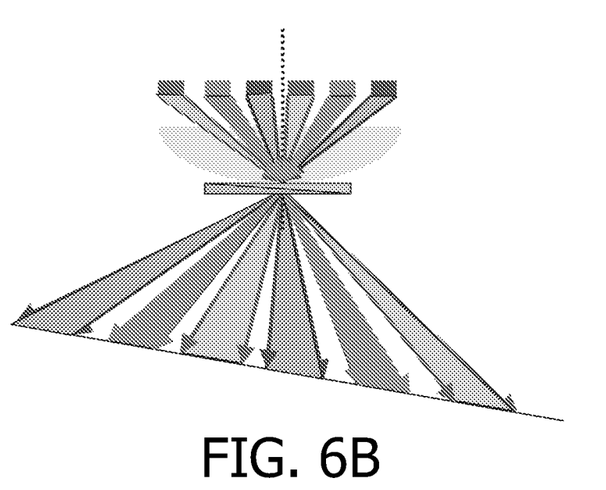
Figure 7A:
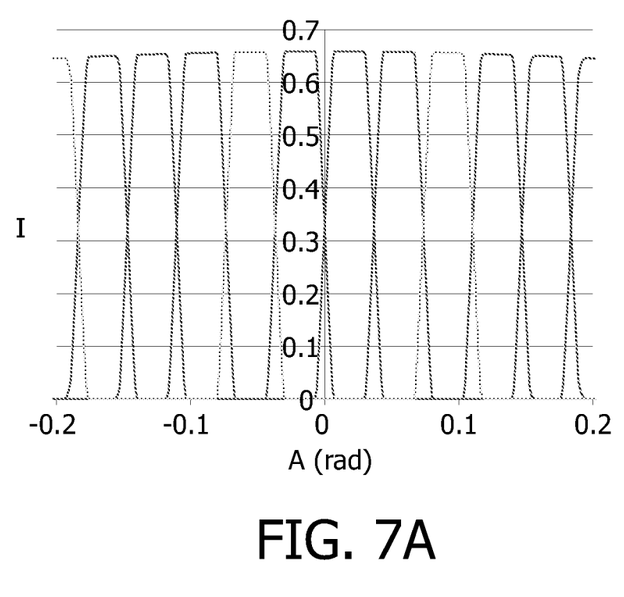
FIGS. 7A and 7B are plots of light intensity against viewing angle also used to explain the operation of the display device shown in FIG. 4.

The undeflected views are shown in FIG. 6A (in cross sectional view) and in FIG. 7A (as a plot of light intensity I against viewing angle A). The deflected views are shown in FIG. 6B (in cross sectional view) and in FIG. 7B (as a plot of light intensity I against viewing angle A). The undeflected and deflected views are shown combined in FIG. 8. As can be seen from these Figures, the deflected views fill the dark angles between the undeflected views so that, when the views are superimposed over one another to simulate integration by the eyes of a user, the dark angles are eliminated and the display device provides a natural look around viewing experience for the user. Thus, the conventional practice of defocusing the display device to disguise the dark angles between views is not necessary. Each of the states shown in the Figs. provides four main views, with these views being repeated on either side of the main views.

The display driver 119 is arranged to sequentially drive the display panel 103 with information for a plurality of views and to switch the view deflecting layer 117 between non-deflecting and deflecting states. The display driver 119 is arranged to perform this driving using a particular driving technique, which will now be described with reference to FIGS. 5A, 5B, 6A, 6B, 7A, 7B.

Figure 7B:
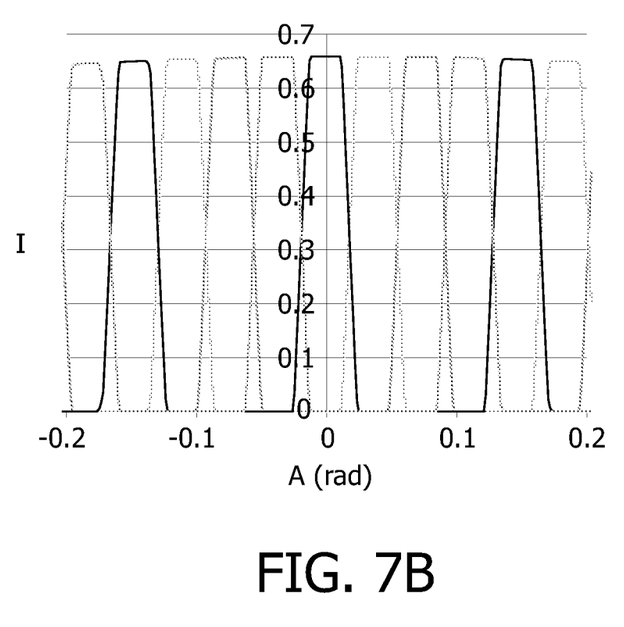

FIGS. 5A, 6A and 7A show the device 101 during a first half of a driving cycle and FIGS. 5B, 6B and 7B show the device during a second half of the driving cycle.

In the first half of the driving cycle, the display driver 119 applies a voltage waveform across the electrodes of the polarization switch 117c. In this state, as described above, the view deflecting layer 117 does not deflect the views formed by the lenticular sheet 109 and the views are therefore projected in a first plurality of directions, as shown in FIGS. 6A and 7A.

Substantially at the same time as applying the voltage waveform across the electrodes of the polarization switch 117c, the display driver 119 drives the display panel 103 with information for a first four views, i.e. views 1, 2, 3, 4. The outputs for the four different views are projected in different directions by the lenticular sheet 109 in the conventional way, with the outputs passing through the view deflecting layer 117 undeflected.

Referring to FIGS. 6B and 7B, in the second half of the driving cycle, the display driver 119 removes the voltage waveform from across the electrodes of the polarization switch 117c. In this state, the views formed by the lenticular sheet and the views are therefore projected in a second plurality of directions, as shown in FIGS. 6B and 7B. Thus, the view deflecting layer 117 has entered the view deflecting state.

Substantially at the same time as removing the voltage waveform from across the electrodes of the polarization switch 117c, the display driver 119 drives display panel 103 with information for a second four views, i.e. views 1', 2', 3', 4' that are different to the first four views 1, 2, 3, 4. The outputs for these four additional views are projected in different directions by the lenticular sheet 109, but the view deflecting layer 117 then deflects the views before they are projected towards the user.

Figure 8:
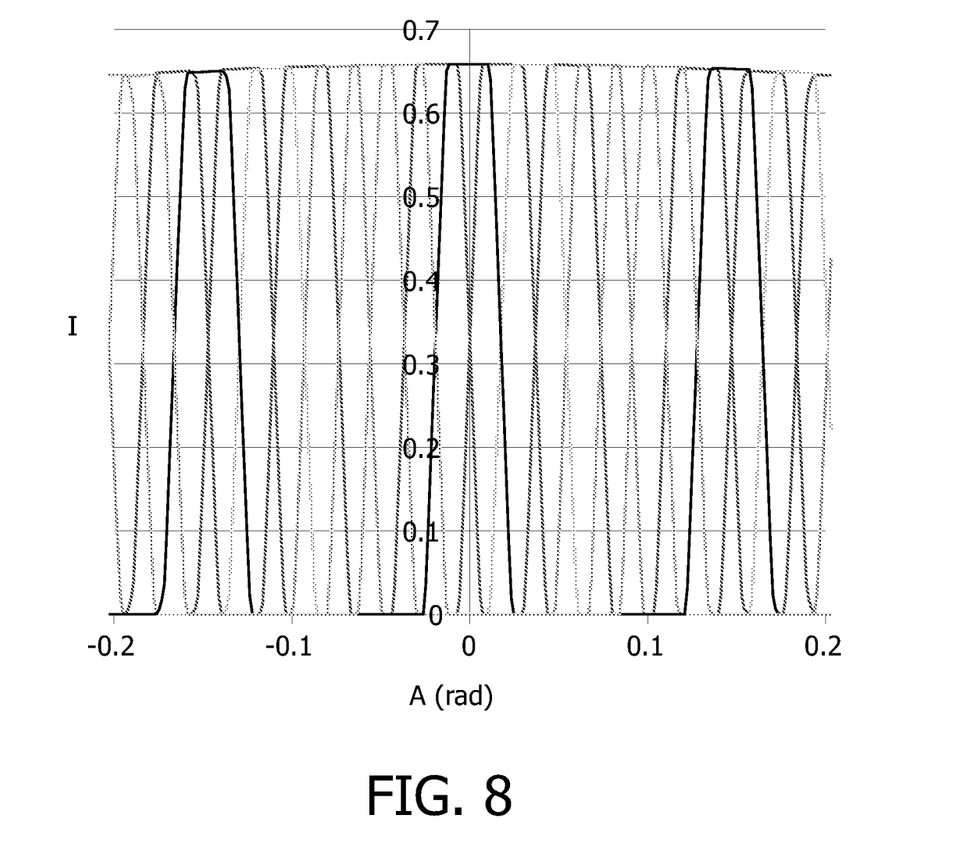
FIG. 8 is another plot of light intensity against viewing angle also used to explain the operation of the display device shown in FIG. 4.

Thus, across the whole of the driving cycle, the display panel 103 is driven with and provides an output for eight different views. These views are projected in different directions, as shown in FIG. 8.

As will be appreciated by the skilled person, at any one time, information for half of the views is being projected by the device 101. However, provided the frame rate of the device is sufficiently high, a user will not notice any screen flicker, no matter which of the eight views are being observed.

The display panel 103 may be a liquid crystal display device having a frame rate of suitable frequency. Such frequencies include for example frequencies of 60 Hertz or higher ones like 80, 100, 120 Hertz etc.). Such a frame rate may be achieved for example using the optically compensated birefringent (OCB) liquid crystal effect, details of which will be known to the skilled person. The liquid crystal display provides polarized display light which can be provided to the polarization switch 117c of the view deflecting means 117.

It will also be appreciated that the use of the display panel 103 to sequentially output the information for different views causes there to be no reduction in the resolution of each view, as compared to many conventional techniques for increasing the number of views.

Figure 9:
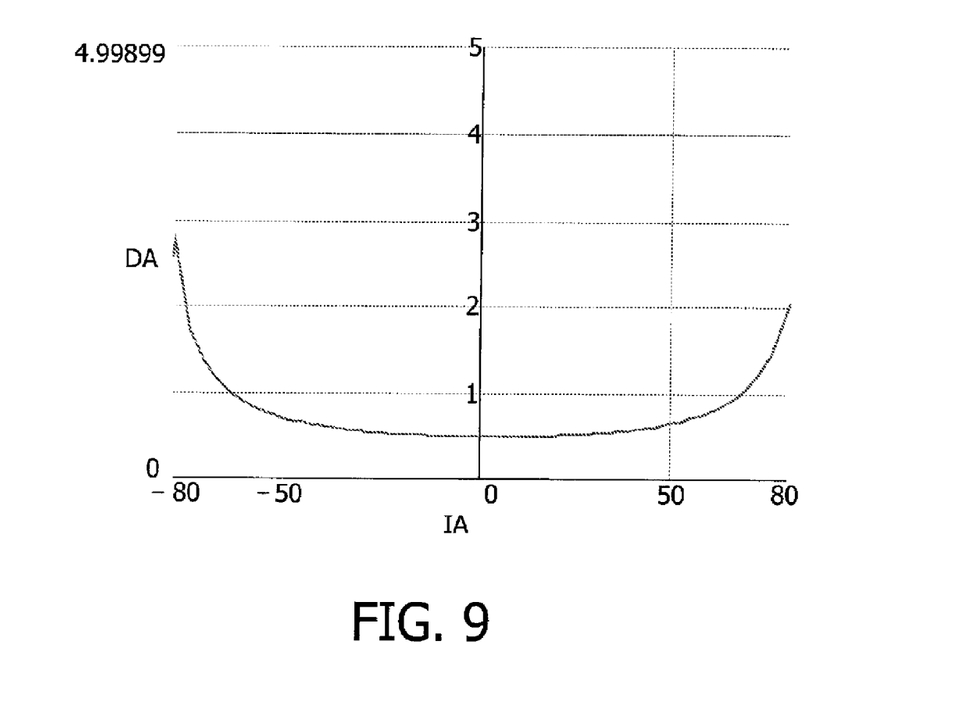
FIG. 9 is a plot of view deflection against incident angle for the display device shown in FIG. 4.

FIG. 9 shows a plot of deflection angle DA provided by the view deflecting layer against incident angle IA of the display light for the above described device 101. As can be seen, the deflection angle remains substantially constant for a wide range of incident angles. Thus, the display device 101 is able to provide evenly spaced non-deflected and deflected views.

Figure 10:
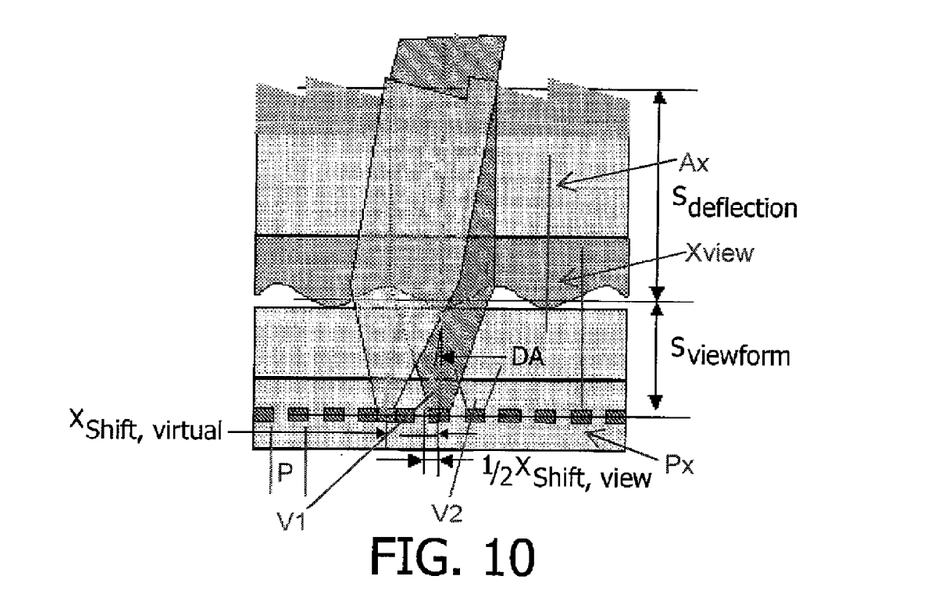
FIG. 10 is a schematic cross sectional view used to explain the detailed design of the display device shown in FIG. 4.

FIG. 10 is a schematic view of the display device 101 which will be used to explain the detailed design of the device.

In practical embodiments of the invention, the view deflecting layer 117 will always be separated by some distance, $S_{deflection}$, from the cylindrical surfaces of the lenticular elements 111 which provide the view forming function. This separation, $S_{deflection}$, causes a degree of lateral shift of the display light. Consequently, it is difficult to provide a practical arrangement in which virtual pixels defined by the deflected views appear equally and evenly spaced between pixels of the non-deflected views.

With reference to FIG. 10, the angle between adjacent non-deflected views is defined by a shift, $X_{shift,view}$, between adjacent pixels of the display panel 103, and a separation, $S_{viewform}$, between the display panel 103 and the lenticular elements 111. $X_{shift,view}$ is the difference between the values of $X_{view}$ for successive views $V_1$ and $V_2$, $X_{view}$ being the horizontal distance between the centre of a pixel Px which generates a view and the axis Ax of an associated view forming element.

From the Figure, it can clearly be seen that the arrangement provides equally and evenly spaced deflected views when, for an $S_{deflection}$ of zero, a deflection angle corresponds to a shift of $(n+\frac{1}{2})X_{shift,view}$, where n is a positive integer.

As well as an evenly spaced angular distribution of views, the pixel structure of a view, as seen by a user, should be regularly spaced. This may be achieved when the virtual pixels of the deflected views are observed in the centers between pixels of the non-deflected views. For an arrangement having a pixel pitch, P, this corresponds to a shift in pixel position of $(m+\frac{1}{2})P$.

The positions of a virtual pixel of a deflected view, for a practical embodiment in which $S_{deflection}$ is non-zero, can be seen in the Figure. It can be seen that the virtual shift, $X(S_{deflection}+S_{viewform})$, is related to the pixel shift, $X(S_{viewform})$:

$$\frac{S_{viewform} + S_{deflection}}{X(S_{deflection} + S_{viewform})} = \frac{S_{viewform}}{X(S_{viewform})}$$

or:

$$S_{deflection} = \left(\frac{X(S_{deflection} + S_{lenticular})}{X(S_{lenticular})} - 1\right)S_{lenticular}$$

By substituting $(n+\frac{1}{2})X_{shift,view}$ and $(m+\frac{1}{2})P$ into this equation, the optimum distance for the deflector for each combination of n and m can be found:

$$S_{deflection} = \left(\frac{(m+1/2)P}{(n+1/2)X_{shift,view}} - 1\right)S_{lenticular}$$

For a typical arrangement of a nine view system having lenticular elements with a slant of ⅙, it can be shown that the shift $X_{shift,view}$ equals ⅙ of the pitch P. Thus:

$$S_{deflection} = \left(6\frac{(m+1/2)}{(n+1/2)} - 1\right)S_{lenticular}$$

The above equation may be used to optimize the arrangement, for example, to provide the smallest possible deflection angle. In order to avoid significant aberration, the deflection of the rays should be chosen to be as small as possible (i.e. n=0). Furthermore, it is preferred to have a small $S_{deflection}$, in order to keep the overall arrangement thin. For n=0, the smallest stack is found for m=0. In this specific case, the formula for $S_{deflection}$ reduces to:

$$S_{deflection} = 5 S_{lenticular}$$

The arrangement may also be optimized to provide a thin stack. By substituting the minimum practical separation $S_{deflection,min}$ and a predefined separation $S_{lenticular}$, we find $$m > m_{min} = \frac{S_{deflection,min} + S_{lenticular}}{6 S_{lenticular}}(n+1/2) - 1/2$$

For each n (n=1, 2, 3, 4 . . . ) the corresponding minimum for m can be calculated, which is found as the first integer above $m_{min}$.

A preferred embodiment of the invention has been described above. However, it will be understood by those skilled in the art that various changes and modifications may be made without departing from the scope of the invention.

For example, the embodiment described above employs a lenticular sheet as a view forming means. However, another view forming means may be used, such as a barrier layer having an array of transmissive slits.

In the embodiment described above, the polarization switch and the array of birefringent prisms of the view deflecting means are provided together over the view forming means. However, the polarization switch and the array of prisms may be provided at any position over the image forming means. The polarization switch and prisms may also be separated from each other, i.e. provided as two distinct layers.

The image forming means in the embodiment described above is a liquid crystal display panel. However, other forms of image forming means may be employed. If the image forming means does not output polarized display light, then the view deflecting means must be provided with a polarizing layer underlying the polarization switch.

In the embodiment described above, the number of views provided by the display device is increased by sequentially driving the image forming means with data for different views. In alternative embodiments, the number of views provided by the display device is not increased, but the angle of each view is increased so as to fill the (otherwise) dark angles between views. Such embodiments advantageously avoid the need for defocusing of the display device to disguise the dark angles.

It should be noted that the above-mentioned embodiments illustrate rather than limit the invention, and at that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that the combination of these measures cannot be used to advantage.

The invention claimed is:

1. A multi-view auto-stereoscopic display device, comprising:
an image forming means that includes an array of display pixels for producing a display,
view forming means positioned over the image forming means and having an array of view forming elements, the view forming elements each being configurable to focus outputs of groups of the display pixels into a plurality of views projected towards a user in different directions; and
view deflecting means positioned over the view forming means, the view deflecting means being arranged to selectably change the directions in which the plurality of views including successive views are projected from an output surface of the multi-view auto-stereoscopic display device towards the user resulting in a shift $X_{shift,view}$ which is a difference between values of $X_{view}$ for the successive views where a first projected view is next to a second projected view, $X_{view}$ being a horizontal distance between a center of a display pixel of one of the groups of the display pixels which generates a view and an axis of an associated view forming element of the array of view forming elements, wherein the view deflecting means comprise at least one birefringent prism having simultaneously a first refractive index for light having a first polarization direction and a second refractive index for light having a second polarization direction, the view deflecting means further comprising a polarization switch and at least one optically isotropic prism, the polarization switch being in registration with the birefringent prism for directly providing the birefringent prism with display light selectably having the first or second polarization direction, the display light passing from the at least one birefringent prism to the at least one optically isotropic prism for direct exit from the output surface towards the user, the at least one optically isotropic prism being more optically isotropic than the at least one birefringent prism, wherein the view forming means are arranged between the image forming means and the view deflecting means, wherein the array of view forming elements comprises an array of lenticular lenses and wherein the image forming means is arranged adjacent to a convex surface of the lenticular lenses, and the view deflecting means is arranged adjacent to a plane surface of the lenticular lenses, wherein the view forming means is configurable to project the plurality of views in directions that are separated by constant angles, and wherein the view deflecting means is arranged to selectably change the directions in which the plurality of views are projected by the substantially constant angles, and wherein separation angles between consecutive views of the plurality of views projected by the view forming means are substantially double deflection angles by which the plurality of views are changed by the view deflecting means, wherein the at least one birefringent prism comprises a first surface for receiving light into the at least one birefringent prism and a second surface for transmitting light out from the at least one birefringent prism, the first surface contacting the second surface to form an acute angle, wherein the at least one isotropic prism comprises a third surface and the output surface, the third surface receiving light into the at least one isotropic prism from the second surface, and the output surface being an outer surface of the multi-view auto-stereoscopic display device and transmitting light of the different directions out directly from the at least one isotropic prism towards the user, the third surface contacting the output surface to form the acute angle.

2. The multi-view auto-stereoscopic display device according to claim 1, wherein the polarization switch comprises a switchable polarization rotator arranged to selectably change the polarization direction of transmitted light from the first direction to the second direction.

3. The multi-view auto-stereoscopic display device arrangement according to claim 2, wherein the switchable polarization rotator comprises a liquid crystal material disposed between transparent electrodes.

4. The multi-view auto-stereoscopic display device according to claim 1, wherein the at least one optically isotropic prism has the same refractive index for the light having the first and second polarization directions, the refractive index of the at least one optically isotropic prism being substantially either the first or second refractive index.

5. The multi-view auto-stereoscopic display device according to claim 1, further comprising a driving means arranged to drive the image forming means with display data for a plurality of views and control the view deflecting means to project the plurality of views in different directions.

6. The multi-view auto-stereoscopic display device according to claim 5, wherein the driving means are arranged to drive the image forming means with display data for first and second pluralities of views, and to control the view deflecting means to project the first and second pluralities of views in different directions.

7. The multi-view auto-stereoscopic display device according to claim 5, wherein the driving means are arranged to:
in a first portion of a driving cycle, drive the image forming means with a first frame of display data for a first plurality of views and control the view deflecting means so that the plurality of views are projected towards the user in a first plurality of directions; and
in a second portion of the driving cycle, drive the image forming means with a second frame of display data for a second plurality of views and control the view deflecting means so that the plurality of views are projected towards the user in a second plurality of directions different to the first plurality of directions.

8. The multi-view auto-stereoscopic display device according to claim 7, wherein the first and the second frames of display data are the same.

9. A driving device for the multi-view auto-stereoscopic display device according to claim 1, the driving device comprising:
driving means for driving the image forming means with display data; and
a deflection controller for controlling the view deflecting means to change the directions in which the plurality of views formed by the view forming means are projected towards the user.

10. A method for driving a multi-view auto-stereoscopic display device, the method comprising acts of:
forming an imager that includes an array of display pixels for producing a display;
forming an array of view forming elements positioned over the imager, the view forming elements each being configurable to focus outputs of groups of the display pixels into a plurality of views projected from an output surface of the multi-view auto-stereoscopic display device towards a user in different directions;
forming deflector positioned over the array of view forming elements, the deflector being arranged to selectably change the directions in which the plurality of views including successive views are projected towards the user resulting in a shift $X_{shift,view}$ which is a difference between values of $X_{view}$ for the successive views where a first projected view is next to a second projected view, $X_{view}$ being a horizontal distance between a center of a display pixel of one of the groups of the display pixels which generates a view and an axis of an associated view forming element of the array of view forming elements;
driving the imager with display data; and
controlling the deflector to change the directions in which the plurality of views formed by the view forming elements are projected towards the user, wherein the deflector comprises at least one birefringent prism having simultaneously a first refractive index for light having a first polarization direction and a second refractive index for light having a second polarization direction, the deflector further comprising a polarization switch and at least one optically isotropic prism, the polarization switch being in registration with the birefringent prism for directly providing the birefringent prism with display light selectably having the first or second polarization direction, the display light passing from the at least one birefringent prism to the at least one optically isotropic prism for direct exit from the output surface towards the user, the at least one optically isotropic prism being more optically isotropic than the at least one birefringent prism, wherein the array of view forming elements is arranged between the imager and the deflector, wherein the array of view forming elements comprises an array of lenticular lenses and wherein the imager is arranged adjacent to a convex surface of the lenticular lenses, and the view deflecting deflector is arranged adjacent to a plane surface of the lenticular lenses, wherein the view forming elements are configurable to project the plurality of views in directions that are separated by constant angles, and wherein the view deflecting deflector is arranged to selectably change the directions in which the plurality of views are projected by the substantially constant angles, and wherein separation angles between consecutive views of the plurality of views projected by the view forming elements are substantially double deflection angles by which the plurality of views are changed by the view deflecting deflector, wherein the at least one birefringent prism comprises a first surface for receiving light into the at least one birefringent prism and a second surface for transmitting light out from the at least one birefringent prism, the first surface contacting the second surface to form an acute angle, wherein the at least one isotropic prism comprises a third surface and the output surface, the third surface receiving light into the at least one isotropic prism from the second surface, and the output surface being an outer surface of the multi-view auto-stereoscopic display device and transmitting light of the different directions out directly from the at least one isotropic prism towards the user, the third surface contacting the output surface to form the acute angle.

11. A computer program product embedded in a non-transitory medium for enabling a programmable device to carry out the method of claim 10.

12. An auto-stereoscopic display device, comprising:
image forming means having an array of display pixels for producing a display;

view forming means positioned over and in registration with the image forming means and having an array of view forming elements, the view forming elements each being configurable to focus outputs of groups of the display pixels into a plurality of views projected from an output surface of the auto-stereoscopic display device towards a user in different directions; and a view deflecting means positioned over and in registration with the view forming means, the view deflecting means being arranged to selectably change the directions in which the plurality of views including successive views are projected towards the user resulting in a shift $X_{shift,view}$ which is a difference between values of $X_{view}$ for successive views where a first projected view is next to a second projected view, $X_{view}$ being a horizontal distance between a center of a display pixel of one of the groups of the display pixels which generates a view and an axis of an associated view forming element of the array of view forming elements, the view deflecting means comprising a polarization switch, at least one birefringent prism and at least one optically isotropic prism, the at least one birefringent prism having simultaneously a first refractive index for light having a first polarization direction and a second refractive index for light having a second polarization direction, the polarization switch directly providing the at least one birefringent prism with display light selectably having the first or second polarization direction, the display light passing from the at least one birefringent prism to the at least one optically isotropic prism for direct exit from the output surface towards the user, the at least one optically isotropic prism being more optically isotropic than the at least one birefringent prism, wherein the view forming means are arranged between the image forming means and the view deflecting means, wherein the at least one birefringent prism comprises a first surface for receiving light into the at least one birefringent prism and a second surface for transmitting light out from the at least one birefringent prism, the first surface contacting the second surface to form an acute angle, wherein the at least one isotropic prism comprises a third surface and the output surface, the third surface receiving light into the at least one isotropic prism from the second surface, and the output surface being an outer surface of the auto-stereoscopic display device and transmitting light of the different directions out directly from the at least one isotropic prism towards the user, the third surface contacting the output surface to form the acute angle.

* * * * *